(No Model.)

H. G. KENNEDY.
BICYCLE SUPPORT.

No. 568,855.  Patented Oct. 6, 1896.

Witnesses
Chas. E. Lawson
H. L. Buchanan

Inventor
Horace G. Kennedy
By his Attorney

UNITED STATES PATENT OFFICE.

HORACE G. KENNEDY, OF DENVER, COLORADO.

BICYCLE-SUPPORT.

SPECIFICATION forming part of Letters Patent No. 568,855, dated October 6, 1896.

Application filed November 30, 1895. Serial No. 570,709. (No model.)

*To all whom it may concern:*

Be it known that I, HORACE G. KENNEDY, a citizen of the United States of America, residing at Denver, in the county of Arapahoe and State of Colorado, have invented certain new and useful Improvements in Bicycle-Supports; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in supports for bicycles, and my object is to provide a device of this class which shall be simple in construction, economical in cost, reliable, durable, and efficient in use; and to these ends the invention consists of the features hereinafter described and claimed, all of which will be fully understood by reference to the accompanying drawings, in which is illustrated an embodiment thereof.

Figure 1:
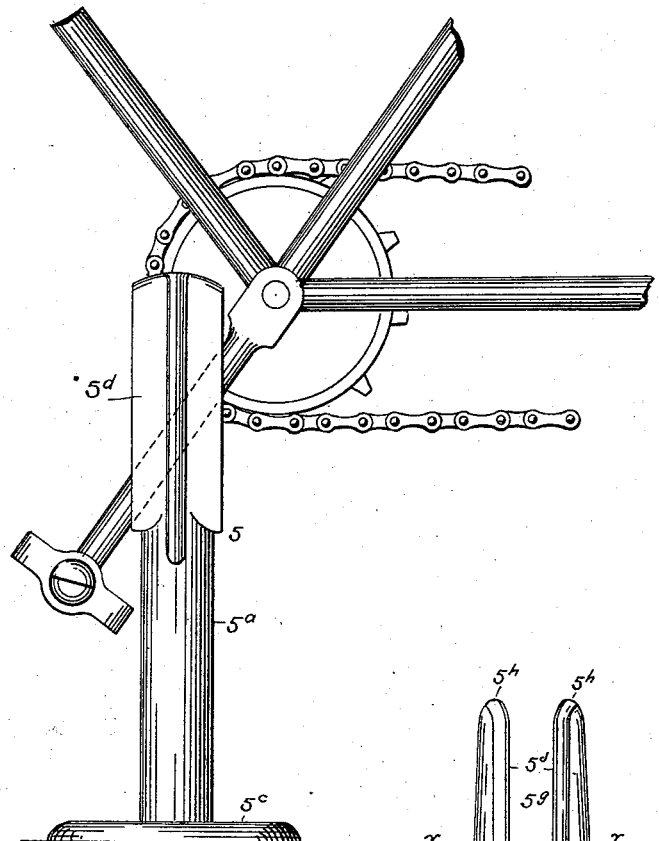
Figure 2:
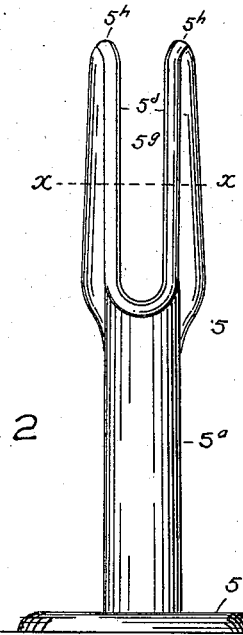
Figure 3:
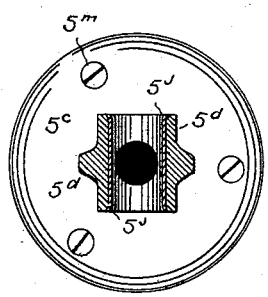

In the drawings, Figure 1 illustrates the device in use, the bicycle being shown in position. Fig. 2 is an elevation of the device shown in detail. Fig. 3 is a horizontal view taken on the line $x\,x$, Fig. 2, looking downward.

Similar reference-characters indicating corresponding parts in the views, let the numeral 5 designate the device, which is preferably composed of metal and cast integral. It may, however, be formed from any suitable material.

The device comprises the standard $5^a$, the flanged base $5^c$, and the forked upper portion composed of the two arms $5^d$, which are separated by an opening $5^g$. The upper extremities of the arms are slightly rounded, beveled, or outwardly flared at the top, as shown at $5^h$, to facilitate the entrance of the bicycle-crank. The inner surface of the arms $5^d$ is lined or covered with some soft material, as leather $5^j$, to prevent marring the crank of the machine.

The flared base $5^c$ is apertured, as shown at $5^m$, to receive screws or other fastening devices, since the device is stationary when in use and occupies an upright position. It must be understood, however, that the base may be made of sufficient width or diameter to support the device in a stable condition without the aid of fastening devices.

In using the device the bicycle is run up beside it, the rear wheel lifted to prevent the machine from moving forward, and one of the cranks thrown into the opening $5^g$ between the arms $5^d$. The rear wheel is then lowered to the surface upon which the supporting device stands. The bicycle is thus supported in an upright position and cannot move either forward or backward until the crank is disengaged from the supporting device.

In Fig. 1 of the drawings the crank engaging the device is not moved down quite as far as should be, since in order to get the best results the crank should occupy a position as nearly perpendicular as possible.

Having thus described my invention, what I claim is—

As an improved article of manufacture, the bicycle-support herein described, comprising the upright standard, a suitable base, and a forked upper portion whose arms are separated by a narrow space adapted to receive the bicycle-crank, said space being of sufficient depth to allow the crank to move downward therein until the pedal engages the lower part of the support on one side, and the butt of the crank the upper part of the support on the opposite side, as and for the purpose set forth.

In testimony whereof I affix my signature in the presence of two witnesses.

HORACE G. KENNEDY.

Witnesses:
CHAS. E. DAWSON,
ALFRED J. O'BRIEN.